(12) United States Patent
Norin

(10) Patent No.: US 9,231,741 B2
(45) Date of Patent: *Jan. 5, 2016

(54) RECONFIGURABLE NOTCHED SPECTRUM FOR WIRELESS DATA TRANSMISSION

(71) Applicant: The DIRECTV Group, Inc., El Segundo, CA (US)

(72) Inventor: John L. Norin, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 13/964,997

(22) Filed: Aug. 12, 2013

(65) Prior Publication Data

US 2014/0036819 A1 Feb. 6, 2014

Related U.S. Application Data

(63) Continuation of application No. 11/523,382, filed on Sep. 18, 2006, now Pat. No. 8,509,158.

(60) Provisional application No. 60/720,522, filed on Sep. 26, 2005.

(51) Int. Cl.
*H04W 16/14* (2009.01)
*H04L 5/00* (2006.01)
*H04L 5/02* (2006.01)
*H04L 27/26* (2006.01)

(52) U.S. Cl.
CPC .............. *H04L 5/0007* (2013.01); *H04L 5/023* (2013.01); *H04W 16/14* (2013.01); *H04L 27/2608* (2013.01)

(58) Field of Classification Search
None
See application file for complete search history.

(56) References Cited

U.S. PATENT DOCUMENTS 8,509,158 B2 * 8/2013 Norin ............................ 370/329

OTHER PUBLICATIONS

Haykin, Cognitive Radio: Brain-Empowered Wireless Communications, IEEE Journal on Selected Areas in Communications, vol. 23, No. 2, Feb. 2005.*

* cited by examiner

*Primary Examiner* — Hoon J Chung

(57) ABSTRACT

Systems and methods for communication are disclosed. A system in accordance with the present invention comprises a communications system, comprising at least one transmitter station and at least one receiver station, the transmitter station and receiver station communicating using an Orthogonal Frequency Division Multiplexing (OFDM) schema, wherein OFDM signals are transmitted in a notched frequency band arrangement such that at least one other transmission within a notch of the notched frequency band is used outside of the communications system.

22 Claims, 9 Drawing Sheets

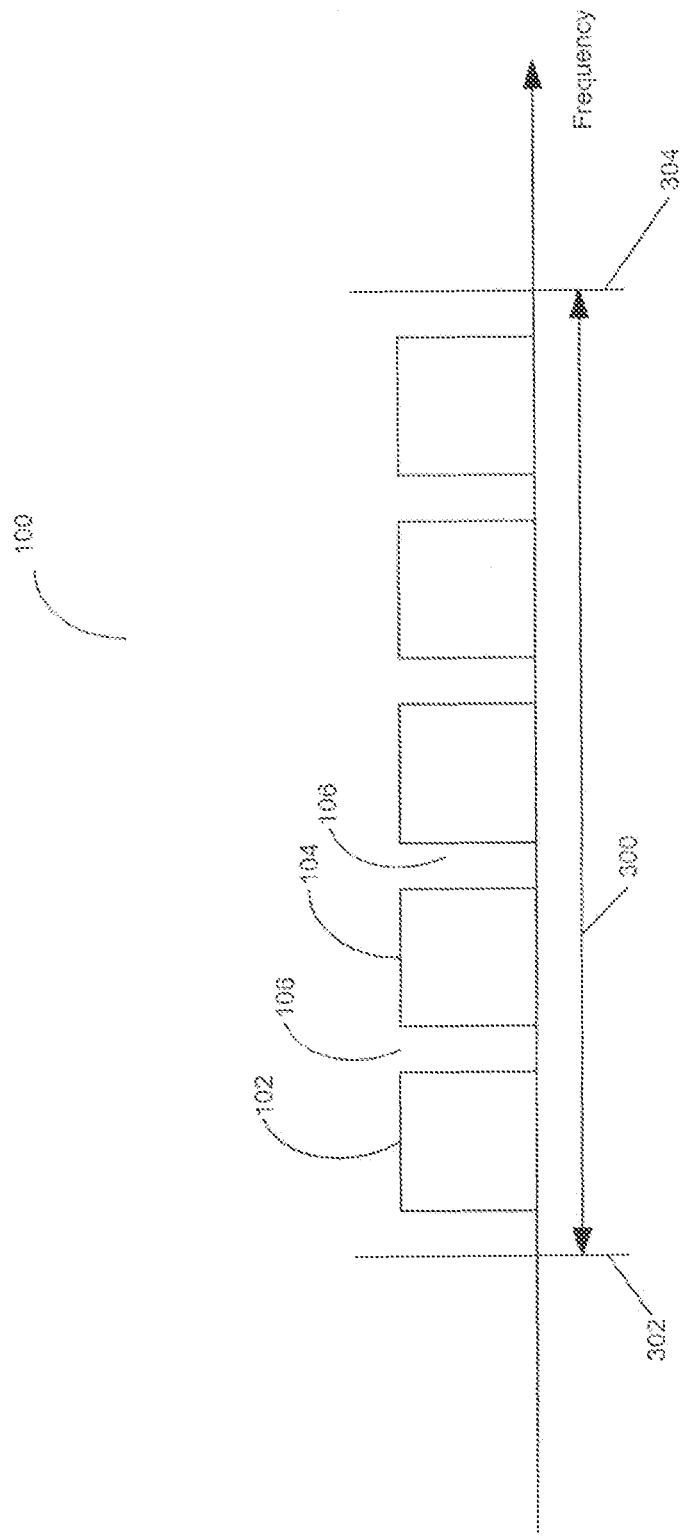

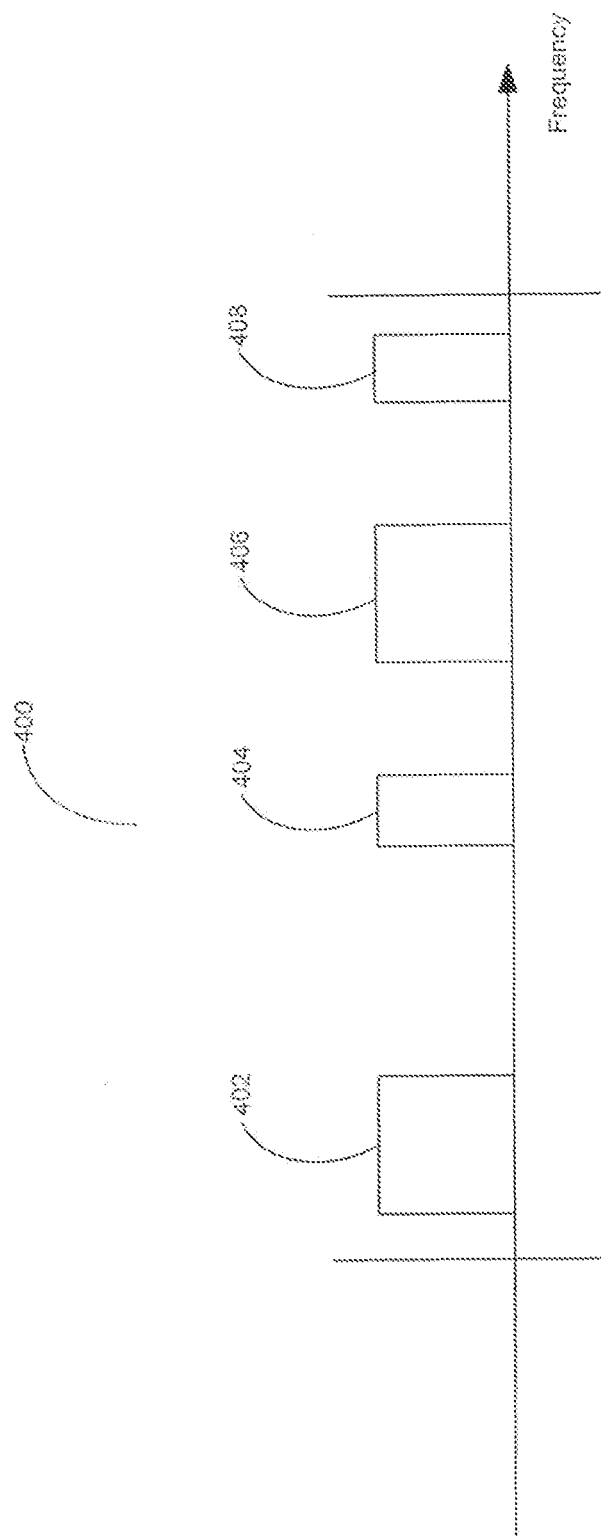

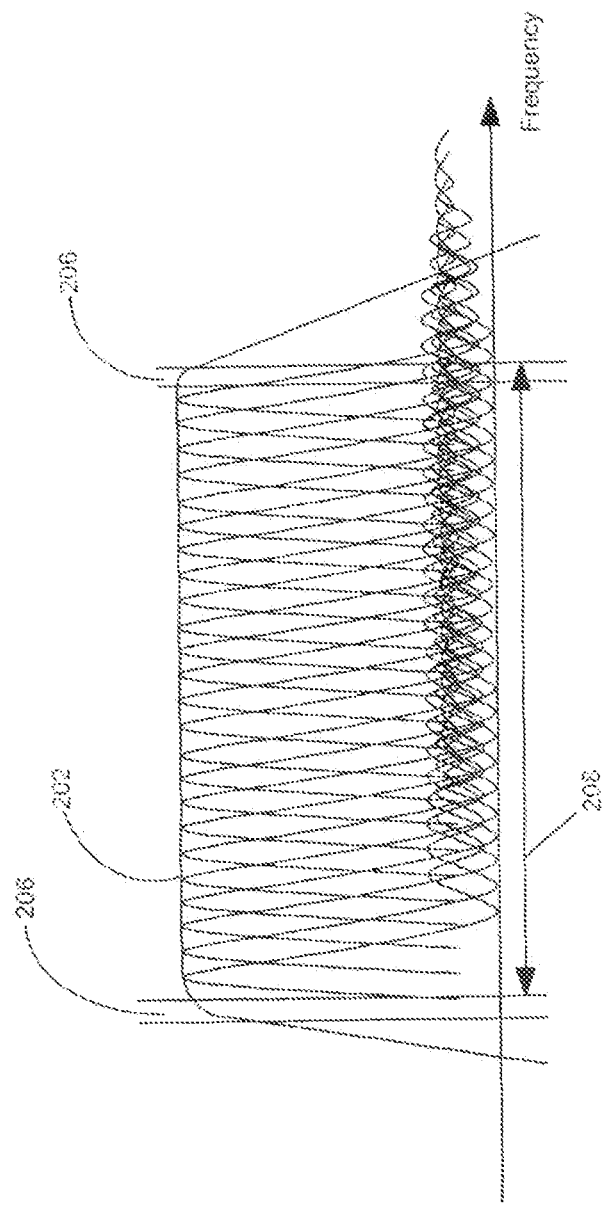

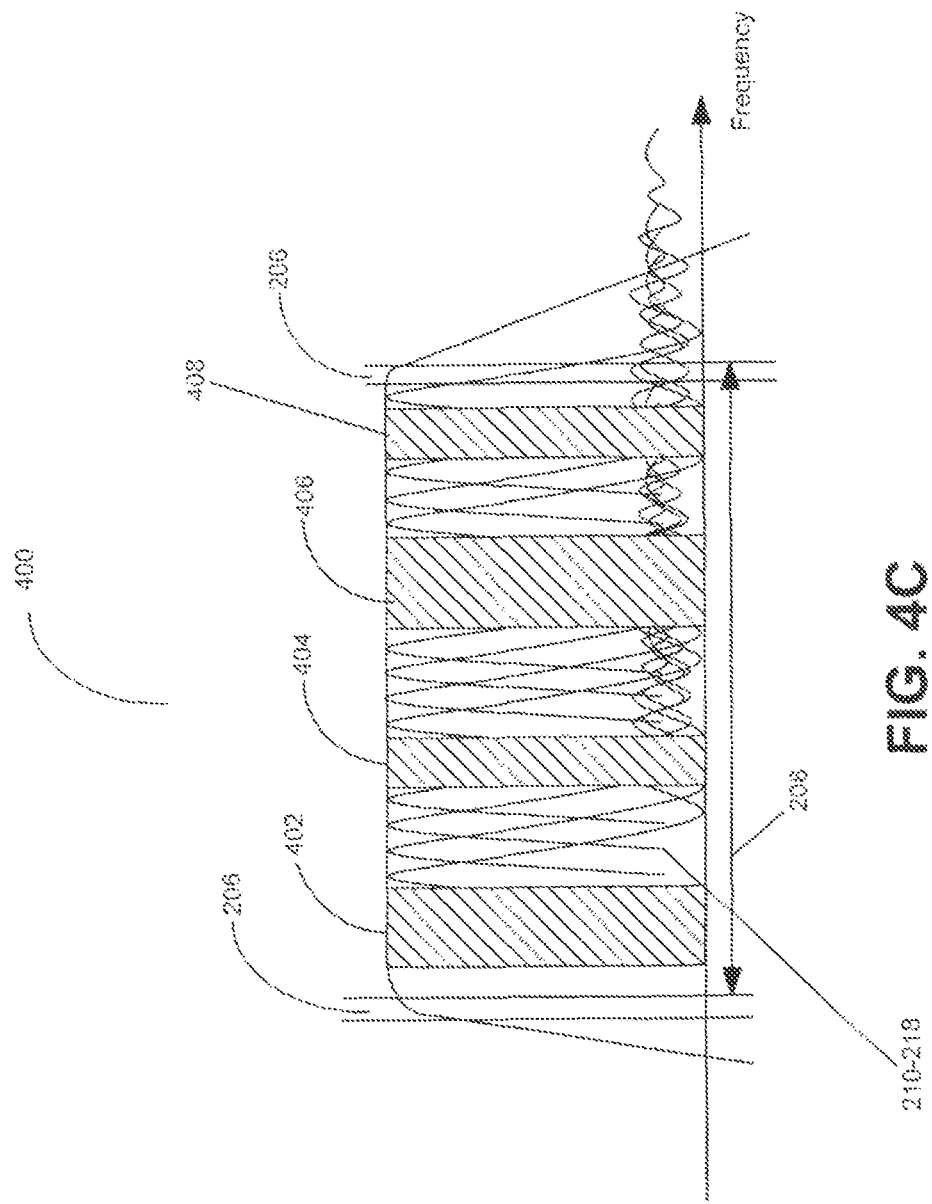

RECONFIGURABLE NOTCHED SPECTRUM FOR WIRELESS DATA TRANSMISSION

CROSS-REFERENCE TO RELATED APPLICATIONS

This application is a continuation of U.S. patent application Ser. No. 11/523,382 filed Sep. 18, 2006, which claims the benefit under 35 U.S.C. Section 119(e) of U.S. provisional patent application Ser. No. 60/720,522, filed Sep. 26, 2005, entitled "RECONFIGURABLE NOTCHED SPECTRUM FOR WIRELESS DATA TRANSMISSION," by John L. Norin, which applications are incorporated by reference herein.

BACKGROUND OF THE INVENTION

1. Field of the Invention

The present invention relates generally to data transmission, and in particular, to a method, apparatus, and article of manufacture for a reconfigurable notched spectrum for wireless data transmissions.

2. Description of the Related Art

Mobile telecommunications devices have become commonplace. Currently, wireless devices, e.g., cellular telephones, Personal Data Assistants (PDAs), and other devices are sending voice, pictures, video, and other data using Radio Frequency (RF) transmission and reception in cellular telephone systems.

Recently, many cellular providers have begun delivering video clips and other video delivery to cellular telephones and other handheld devices for viewing by a subscriber using higher speed data communications systems. Such delivery requires a large amount of bandwidth of dedicated spectrum for cellular telephones, typically in the 850 MHz or 1900 MHz range of cellular and PCS frequency bands.

Other types of high speed broadband RF transmission systems are possible, such as satellite transmission of voice, data, and video, however, the mobile devices used in such systems are typically much larger than desired because of the additional distance that transmissions from the mobile device are required to travel. The additional distance requires the mobile device to have a larger transmitter power, larger antenna, and, as such, are not quite as desirable to many users.

Further, wireless device users want to be able to use the portable and mobile devices anywhere, including inside of buildings. As such, the systems that support such devices must have a high enough signal strength to penetrate buildings and other structures so that users can operate their mobile devices over a large geographic area without worrying about any interruption of service.

Another typical problem for competing mobile devices is spectrum allocation. The RF frequencies available for transmission are extremely limited, because there are other competing governmental and private entities that have licenses to the frequency spectrum. Further, large contiguous portions of spectrum that would support broadband wireless services are not commonly available for many frequency bands. Only small portions of previously-allocated frequency bands are available, since those portions may not be currently in use by the spectrum owners. Typically, such a small portion is of no use to others, since the portion is not enough to support an entire broadband communications system.

It can be seen, then, that there is a need in the art for portable handheld and mobile devices that can receive broadband data. It can also be seen that there is a need in the art for a mobile device that can be used in a large number of places, including inside buildings, with minimal service interruption. It can also be seen that there is a need in the art for a communications system that can transmit and receive by aggregating smaller parts of the frequency spectrum into a single larger communications channel for use in a broadband service. Such a system can be used to provide fixed broadband service while at the same time providing next generation broadband access for portable and mobile wireless users.

SUMMARY OF THE INVENTION

To minimize the limitations in the prior art, and to minimize other limitations that will become apparent upon reading and understanding the present specification, the present invention discloses systems and methods for communication. A system in accordance with the present invention comprises a communications system, comprising a transmitter station and at least one receiver station, the transmitter station and receiver station communicating using an Orthogonal Frequency Division Multiplexing (OFDM) schema, wherein OFDM signals are transmitted in a notched frequency band such that at least one other transmission within a notch of the notched frequency band is used outside of the communications system.

Such a system optionally further includes the notch of the notched frequency band being repositioned within the frequency band, the notched frequency band being a Mobile Satellite Service (MSS) frequency band, the notch of the notched frequency band being used in a MSS system, and the system transmitting broadband internet data operating under the rules of the Ancillary Terrestrial Component (ATC) of the MSS frequency band.

BRIEF DESCRIPTION OF THE DRAWINGS

Referring now to the drawings in which like reference numbers represent corresponding parts throughout:

FIG. 3 illustrates a typical use of frequency spectrum;

FIGS. 4A-C illustrate the notching of the frequency spectrum for use with the OFDM transmission schema in accordance with the present invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A typical spectrum plan has a contiguous range of frequencies, with discrete allocated channels for individual carriers and guardbands between the channels, for transmission and reception of data between two points. The present invention uses Orthogonal Frequency Division Multiplexing (OFDM), and one or more virtual notch filters, to transmit data in a non-contiguous range of frequencies. The virtual notch filters prevent transmission from the system in those areas of spectrum that are already being used by others, but still allows for use of small portions of frequency spectrum for data delivery between two points. The use of OFDM, which is a multi-tone system transmitting all data on all carriers, allows for a smaller transmission band such that small pieces of frequency spectrum can still be used efficiently while dropping selected tones to create the virtual notches in the frequency spectrum.

By having a device that can receive all frequencies across the transmission band, and a base station that only transmits in certain portions of the band, the system is reconfigurable by changing only the configuration of the base station hardware, rather than having to update all of the base station and user devices when additional spectrum becomes available or some frequencies become unavailable to the system.

Typical Transmission Schema

Figure 1:
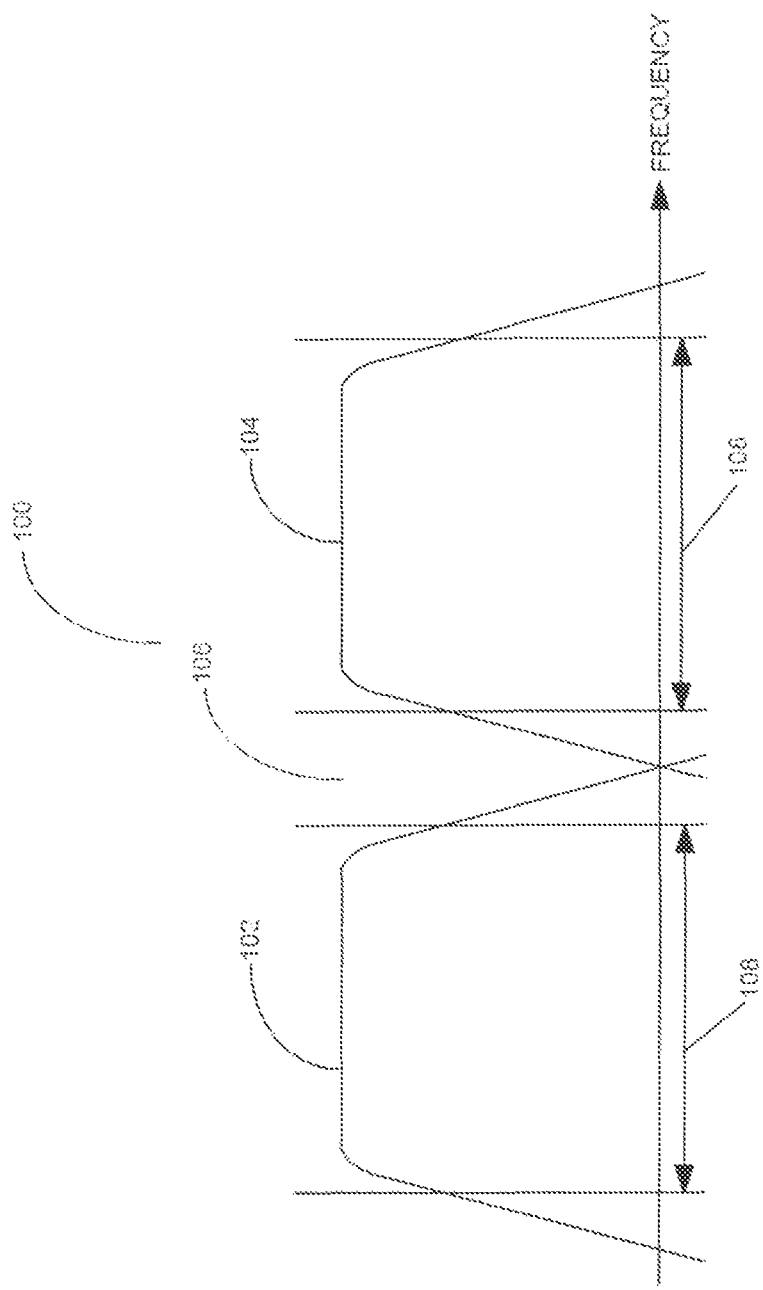
FIG. 1 illustrates a typical transmission schema.

FIG. 1 illustrates a typical transmission schema.

Transmission schema 100 is shown, with channels 102 and 104, and guardband 106. Channels 102 and 104 are typically a specific frequency width 108, such that each channel 102 or 104 can contain all of the data needed for each channel 102 or 104. Each width 108 is determined by the amount of data each channel 102 or 104 contains, and guardband 106 is used to ensure that channel 102 does not interfere with channel 104 in terms of frequency overlap. When received, schema 100 uses a filter or other means to segregate channel 102 from channel 104, and selects which channel 102 or 104 is desired.

OFDM Transmission Schema

Figure 2:
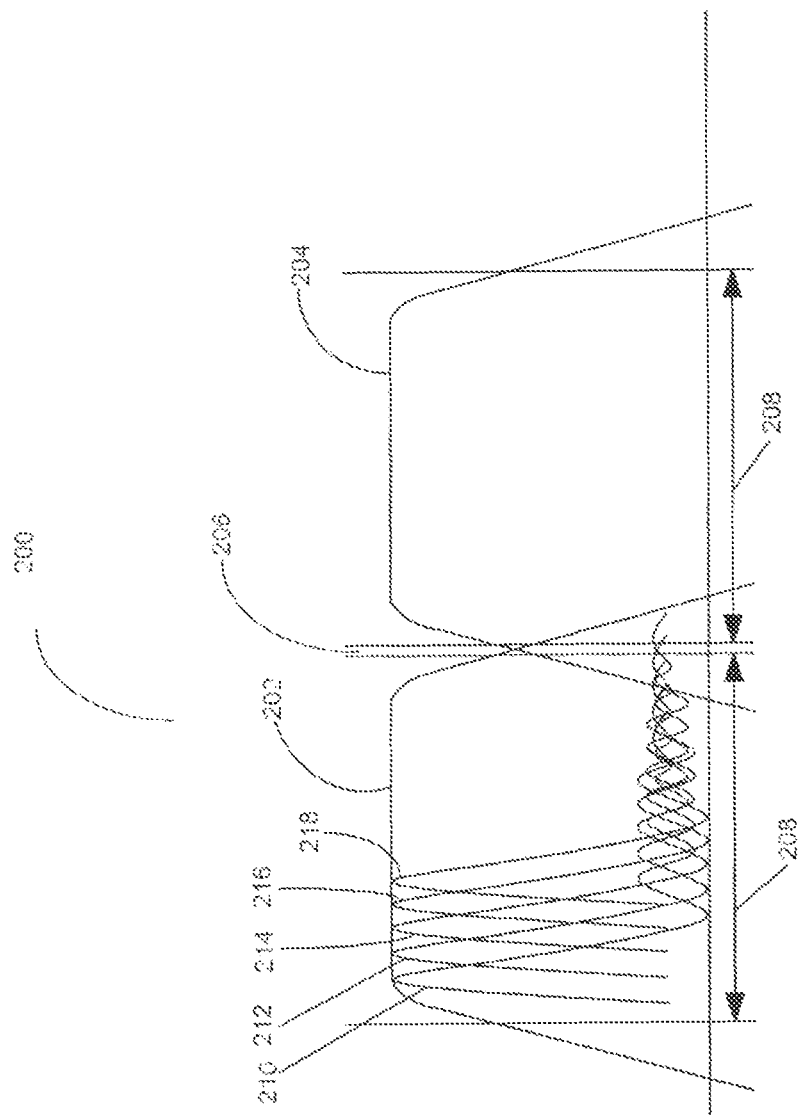
FIG. 2 illustrates a typical OFDM transmission schema.

FIG. 2 illustrates a typical OFDM transmission schema.

OFDM schema 200 shows channels 202 and 204, and guardband 206. Within each channel 202 and 204, each available frequency range 208 is broken up into several narrowband sub-carriers 210-218. In a general sense, the entire available frequency spectrum is subdivided into a high number N of sub-carriers 210-218 such that the difference in frequency between adjacent sub-carriers 210-218, i.e., sub-carriers 210 and 212, is determined by $$\Delta f = BW/N$$

Where $\Delta f$=the difference in frequency,

BW=the available bandwidth, and

N=the number of sub-carriers.

For example, and not by way of limitation, if the bandwidth BW is 300 MHz, and the difference in frequency is 1 MHz, then there are 300 sub-carriers 210-218 in a given channel 202 or 204.

Each sub-carrier 210-218 carries all of the data that is to be transmitted in schema 200 using Quadrature Amplitude Modulation (QAM) or other modulation techniques. This allows the schema 200 to transmit in parallel all of the data on each sub-carrier 210-218.

With respect to guardband 206, since the schema 200 uses so many carriers, guardband 206 may not be necessary at all depending on the configuration of carrier 204, or, if guardband 206 is necessary, is much smaller, since each of the sub-carriers 210-218 is of a much smaller bandwidth than any carrier in transmission schema 100, and therefore requires much less protection against any adjacent sub-carrier 210-218 or other transmission that is occurring at adjacent frequencies.

Notch Bands for Non-Transmission of Data

FIG. 3 illustrates a typical use of frequency spectrum.

Schema 100 is typically used along a continuous frequency band 300, from starting frequency 302 to end frequency 304. Channels 102 and 104, along with guardbands 106, are shown, to protect channels 102 and 104 from interfering with each other, as well as preventing channel 102 from interfering with any transmissions that occur in frequencies below start frequency 302 and above end frequency 304.

FIGS. 4A-4C illustrates the notching of the frequency spectrum for use with the OFDM transmission schema in accordance with the present invention.

FIG. 4A illustrates spectrum 400, with sections 402-408 of spectrum 400 being already used by current spectrum owners and/or licensees. Such sections of spectrum 400 are used in such a manner in, for example, the Mobile Satellite Spectrum (MSS) portion of the frequency spectrum, which is located approximately in the 1525-1660.5 MHz portion of the frequency spectrum. Several users occupy various portions 402-408 of the spectrum with existing transmitting equipment.

FIG. 4B illustrates the OFDM system configured to transmit over the entire spectrum 400.

As discussed with respect to FIG. 2, the OFDM schema 200 can be spread over a large contiguous frequency range as channel 202, with individual carriers spanning the entire frequency range 208. If desired, guardbands 206 can be implemented, where the guardbands 206 can be within frequency range 208 or outside of frequency range 208.

FIG. 4C illustrates the ODFM schema that has been notched out for simultaneous transmission of the pre-existing transmissions and the ODFM data.

Pre-existing transmissions 402-408 are now preserved, while sub-carriers 210-218 are interspersed within the pre-existing transmissions 402-408 throughout the entire frequency range 400. Even small portions of frequency spectrum can be utilized, as long as a sub-carrier 210 can transmit between pre-existing transmissions 402-408, then that portion of spectrum 400 can be utilized in accordance with the present invention.

Figure 5:
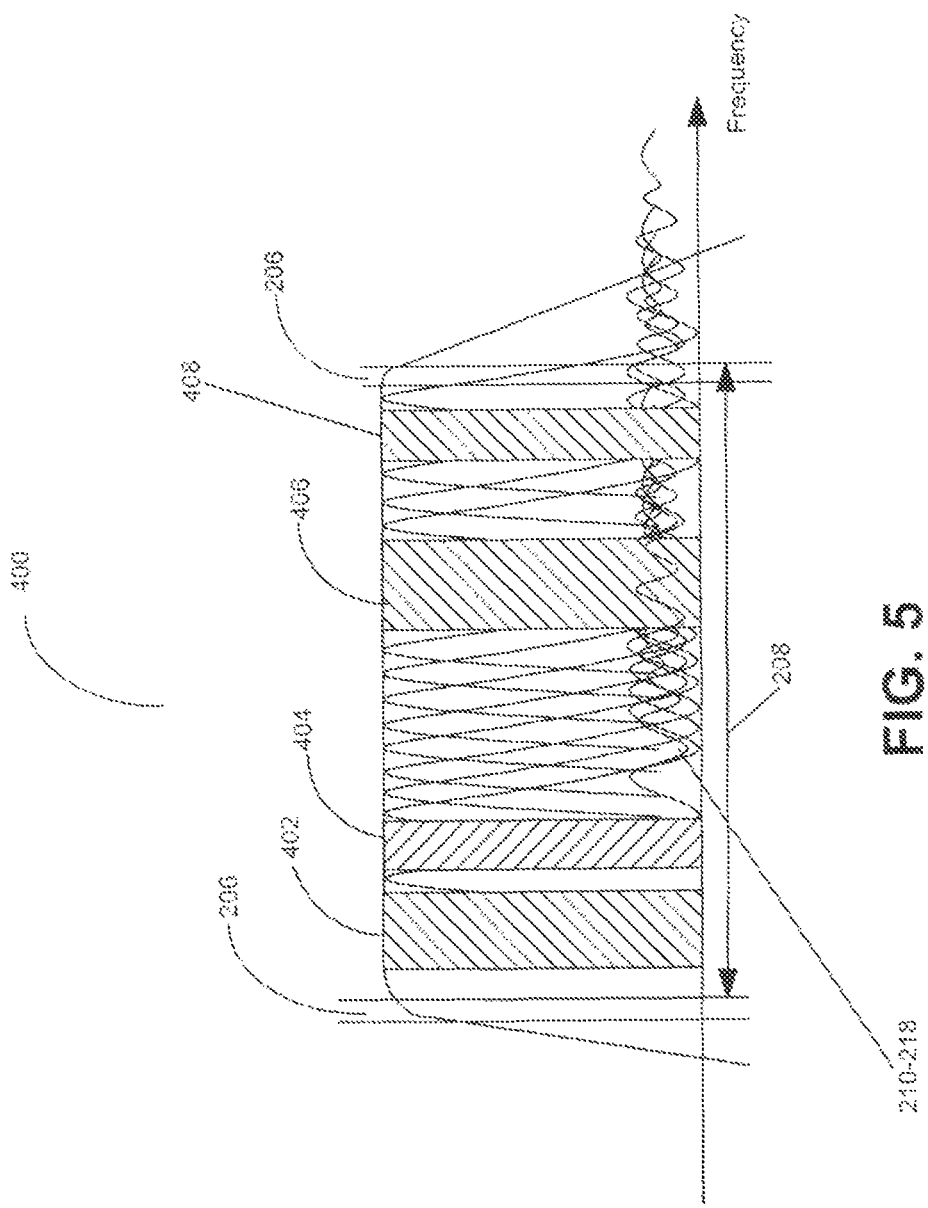
FIG. 5 illustrates the reconfigurability of the frequency spectrum in accordance with the present invention.

FIG. 5 illustrates the reconfigurability of the frequency spectrum in accordance with the present invention.

If a pre-existing transmission 404 within spectrum 400 is re-positioned within spectrum 400, the present invention merely changes a mask or notch filter at the transmission portion of the schema 200, which then allows different sub-carriers 210-218 to be transmitted and different sub-carriers 210-218 to be suppressed prior to transmission. Further, the transmission 404 may be a regional transmission, and, as such, schema 200 can be customized by geographic area if desired.

Figure 6:
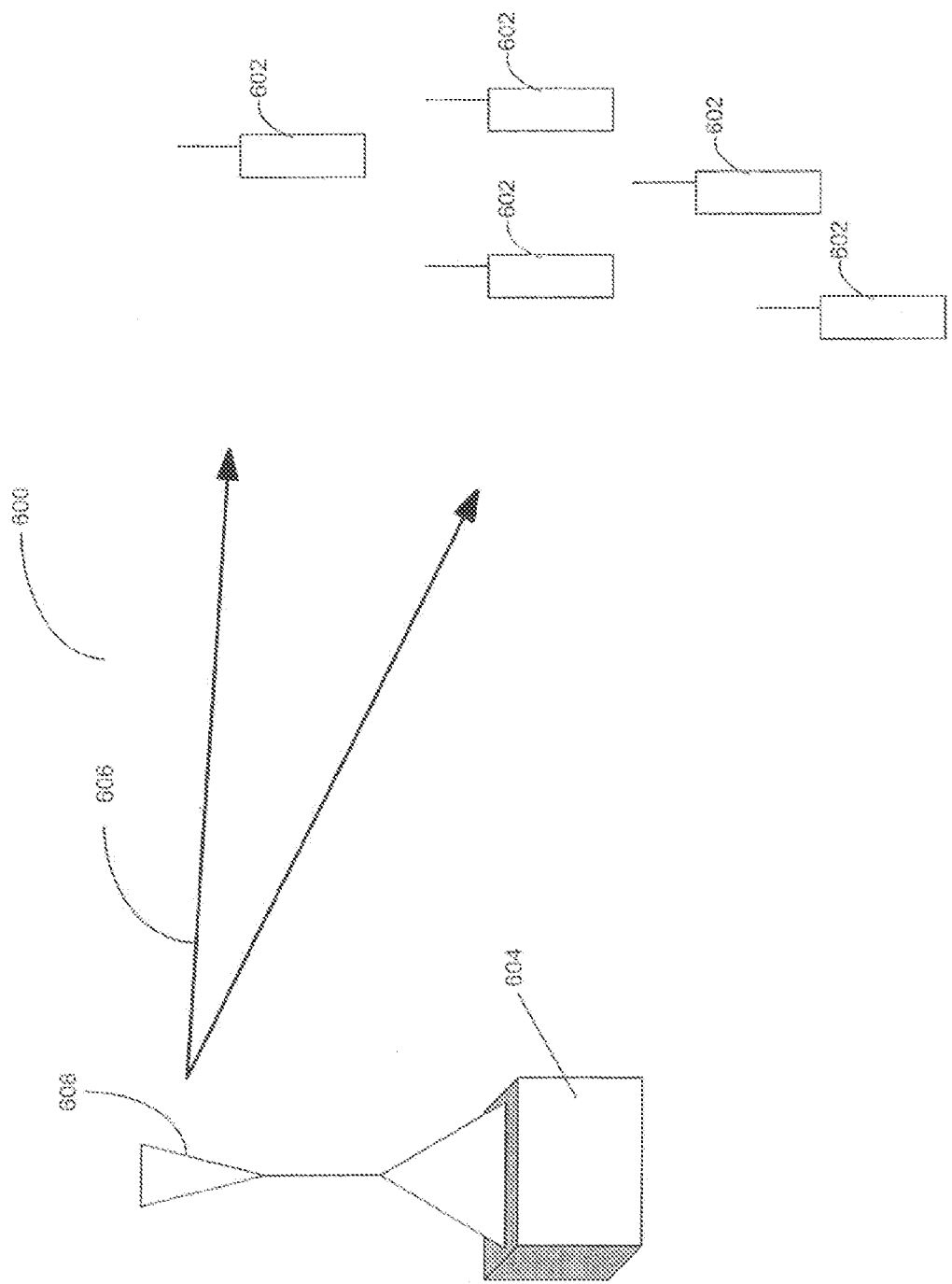
FIG. 6 illustrates a typical transmission system in accordance with the present invention.

FIG. 6 illustrates a typical transmission system in accordance with the present invention. System 600 shows receivers 602, transmitter station 604, and signals 606. Receivers 602 are typically mobile devices, such as cellular telephones and PDA's, but can be specialty devices such as laptop computers or other fixed devices specifically designed to receive signals in system 600.

Transmitter 604 transmits signals 606 from antenna 608. Signals 606 are OFDM signals that have been notched out as described in FIGS. 4C and 5. Transmitter station 604 is reconfigurable as described in FIG. 5, since receivers 602 are designed to receive signals through out the frequency bands of interest, and transmitter station 604 is merely programmed or designed to transmit in specific portions of the spectrum used in system 600.

Antenna 608 can be an omnidirectional antenna, however, it is envisioned within the scope of the present invention that antenna 608 can also be sectorized and/or an adaptive antenna, such as a phased array antenna, such that signals 606 can be formed to travel in specific directions away from transmitter station 604. Although only one transmission station 604 is shown, many transmission stations 604 are envisioned, similar to a cellular telephone system. Further, system 600 can be co-located with a cellular telephone system if desired for ease of construction of system 600.

Receivers 602 can learn how to transmit data within the system 600, e.g., to the transmission station 604, via a number of methods, e.g., via the same channel as they receive from transmission station 604, via a registration process that is sent out from transmission station 604, via a tone/timing map that is broadcast or otherwise transmitted by the transmission station 604, etc.

Flowchart

Figure 7:
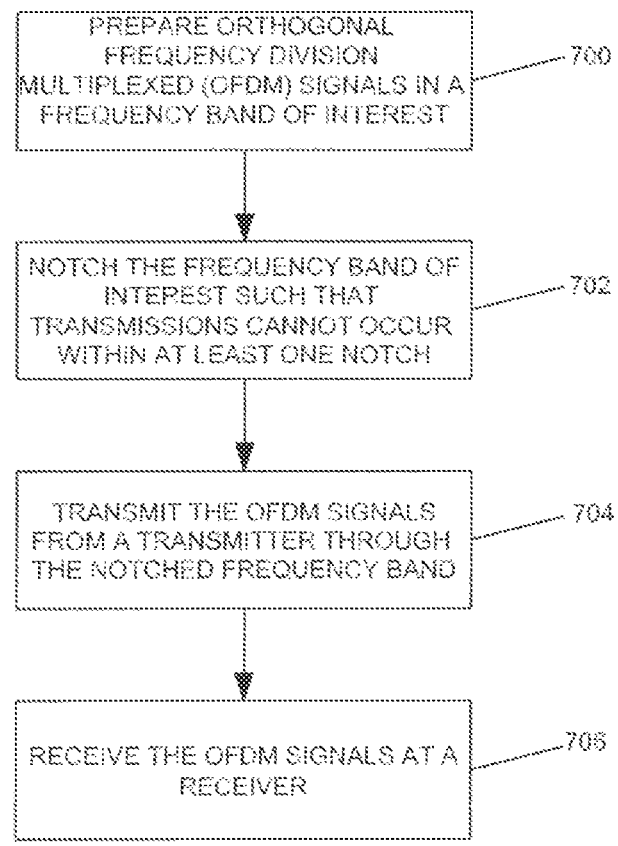
FIG. 7 illustrates a flowchart showing a method in accordance with the present invention.

FIG. 7 illustrates a flowchart showing a method in accordance with the present invention.

Box 700 illustrates preparing Orthogonal Frequency Division Multiplexed (OFDM) signals in a frequency band of interest.

Box 702 illustrates notching the frequency band of interest such that transmissions cannot occur within at least one notch.

Box 704 illustrates transmitting the OFDM signals from a transmitter through the notched frequency band.

Box 706 illustrates receiving the OFDM signals at a receiver.

Conclusion

This concludes the description of the preferred embodiment of the invention.

The present invention can also be used in other frequency bands other than the MSS band. Further, the present invention can also be used in conjunction with other technologies, such as cellular telephony and/or Personal Communication Systems (PCS), to deliver data via multiple data streams to a given device capable of receiving the multiple data streams. Other types of systems other than an OFDM system can be used within the present invention if desired.

In summary, the present invention describes systems and methods for communication. A system in accordance with the present invention comprises a communications system, comprising at least one transmitter station and at least one receiver station, the transmitter station and receiver station communicating using an Orthogonal Frequency Division Multiplexing (OFDM) schema, wherein OFDM signals are transmitted in an arrangement of a spectrally notched frequency band such that at least one other transmission within a notch of the notched frequency band is used outside of the communications system.

Such a system optionally further includes the notch of the notched frequency band being repositioned within the frequency band, the notched frequency band being a Mobile Satellite Service (MSS) frequency band, the notch of the notched frequency band being used in a MSS system, and the system transmitting broadband internet data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the equivalents thereof.

What is claimed is:

1. An Orthogonal Frequency Division Multiplexing communications system, comprising:
at least one transmitter, configured to transmit Orthogonal Frequency Division Multiplexing (OFDM) signals only in a notched frequency band arrangement within a continuous frequency spectrum wherein a predetermined notch of the notched frequency band arrangement is allocated for use by a separate communications system other than the OFDM communications system, and each unnotched portion of the notched frequency band arrangement comprises at least one subcarrier of the OFDM signals.

2. The OFDM communications system of claim 1, wherein the predetermined notch of the notched frequency band arrangement is repositioned within the notched frequency band arrangement in response to a repositioning of the predetermined notch of the frequency spectrum allocated for use by a separate communications system other than the OFDM communications system.

3. The OFDM communications system of claim 1, wherein the notched frequency band arrangement is reconfigured according to geographic area.

4. The OFDM communications system of claim 1, wherein the notched frequency band arrangement comprises Mobile Satellite Service (MSS) frequency bands.

5. The OFDM communications system of claim 4, wherein the notch of the notched frequency band arrangement is used in a MSS system.

6. The OFDM communications system of claim 1, wherein the OFDM communications system transmits broadband internet data via the OFDM signals.

7. A communications method for use with an Orthogonal Frequency Division Multiplexed (OFDM) communications system, comprising:
preparing OFDM signals in a continuous frequency band of interest;
notching the continuous frequency band of interest such that transmissions are blocked within at least one predetermined notch of the continuous frequency band of interest, wherein the predetermined notch of the notched frequency spectrum is allocated for use by a communications system other than the OFDM communication system; and
transmitting the OFDM signals from a transmitter through the notched frequency band of interest, wherein the OFDM signals are transmitted in the continuous frequency band of interest and outside the at least one predetermined notch and each portion of the notched continuous frequency band of interest comprises at least one sub-carrier of the OFDM signals.

8. The method of claim 7, wherein the continuous frequency band of interest is a Mobile Satellite Spectrum (MSS) band.

9. The method of claim 7, further comprising reconfiguring the notches of the notched frequency band of interest in response to a repositioning of the predetermined notch of the frequency spectrum.

10. An apparatus for receiving Orthogonal Frequency Division Multiplexed (OFDM) signals transmitted by a OFDM communications system, comprising:
a receiver, configured to receive the OFDM signals transmitted by the OFDM communications system in a notched frequency band arrangement within a continuous frequency spectrum wherein at least one predetermined notch of the notched frequency band arrangement is allocated for use by a separate communications system other than the OFDM communications system, and each unnotched portion of the notched frequency band arrangement is used by the OFDM schema to transmit at least one subcarrier of the OFDM schema.

11. The apparatus of claim 10, wherein the predetermined notch corresponds to a transmission within a Mobile Satellite System (MSS) band.

12. The apparatus of claim 10, wherein the OFDM communications system is reconfigurable by reconfiguring the notches of the notched frequency band arrangement.

13. The apparatus of claim 12, wherein the OFDM communications system is reconfigured by geographic area.

14. The apparatus of claim 10, wherein the receiver is authorized to transmit a receiver signal within the OFDM communications system after registration within the OFDM communications system.

15. The apparatus of claim 14, wherein the receiver is configured to transmit the receiver signal on a transmit frequency assigned by the OFDM communications system after the registration.

16. The apparatus of claim 10, wherein the receiver is configured to transmit a receiver signal within the at least one of the unnotched portions of the continuous frequency spectrum in which receiver received at least one of the OFDM multiplexed signals.

17. The apparatus of claim 10 wherein the receiver is configured to transmit a receiver signal according to a tone/timing map received from the OFDM communications system.

18. In a notched frequency spectrum comprising notched portions and unnotched portions therebetween, each notched portion having one of a plurality of first frequency bands and a first communication system transmitting a first signal in one or more of the first frequency bands and not on the unnotched portions, an Orthogonal Frequency Division Multiplexed (OFDM) communications system, comprising:

a transmitter, configured to transmit a second signal on a plurality of subcarriers, at least one of the plurality of subcarriers transmitted in at least one of the plurality of unnotched portions, and none of the plurality of subcarriers transmitted in the plurality of first frequency bands, wherein the second signal is OFDM.

19. The OFDM communications system of claim 18, wherein the notched portions of the notched frequency band are predetermined.

20. The OFDM communications system of claim 18, wherein at least one of the plurality of first frequency bands comprises a Mobile Satellite Service (MSS) frequency band.

21. The OFDM communications system of claim 18, wherein the transmitter is reconfigurable by repositioning the notched portions.

22. The OFDM communications system of claim 21, wherein the transmitter is reconfigured according to geographic area.

* * * * *